United States Patent
Hiramatsu

(10) Patent No.: US 6,519,278 B1
(45) Date of Patent: *Feb. 11, 2003

(54) TRANSMITTING/RECEIVING APPARATUS USING A PLURALITY OF SPREADING CODES

(75) Inventor: Katsuhiko Hiramatsu, Yokohama (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 181 days.

(21) Appl. No.: 08/814,029

(22) Filed: Mar. 10, 1997

(30) Foreign Application Priority Data

May 24, 1996 (JP) .............................. 8-151800

(51) Int. Cl.[7] ................................. H04K 1/02
(52) U.S. Cl. .................. 375/206; 375/224; 375/285; 375/346; 37/353; 37/342; 455/517; 455/422; 455/67.3; 455/69
(58) Field of Search ................ 375/200, 206, 375/208, 210, 219, 224, 227; 370/252, 320, 335, 342; 455/63, 67.3, 69, 70, 226.1–226.3, 422, 517; 714/748

(56) References Cited

U.S. PATENT DOCUMENTS

| | | | |
|---|---|---|---|
| 5,442,625 A | 8/1995 | Gitlin et al. | |
| 5,781,542 A | * 7/1998 | Tanaka et al. | 370/342 |
| 5,844,935 A | 12/1998 | Shoji | 375/200 |
| 5,859,874 A | 1/1999 | Wiedeman et al. | 375/267 |
| 5,862,171 A | 1/1999 | Mahany | 375/200 |

FOREIGN PATENT DOCUMENTS

| | | |
|---|---|---|
| EP | 0833475 A2 | 4/1998 |
| JP | 7283763 | 10/1995 |
| JP | 8-63085 | 6/1996 |
| JP | 8163085 | 6/1996 |

OTHER PUBLICATIONS

Seo, et al. "SIR measurement scheme using pilot symbols for transmit power control of DIS–CDMA," Technical Report of IEICE, RCS96–74, Aug. 1996, pp. 57–62.
Zhao Liu, et al., "A Demand–Assignment Access Control for Multi–Code DS CDMA Wireless Packet (ATM) Networks", March 24, 1996, pgs. 713–721.
European Search Report dated December 13, 1999.

* cited by examiner

Primary Examiner—Amanda T. Le
(74) Attorney, Agent, or Firm—Stevens, Davis, Miller & Mosher L.L.P.

(57) ABSTRACT

Transmitting/receiving apparatuses are installed in a base station and a mobile station, respectively, to perform mutual transmission and reception by using a plurality of spreading codes. The transmitting/receiving apparatus installed in the base station has a block for designating to the mobile station the kind and the number of spreading codes used in a reverse link from the mobile station to the base station through a forward link at the time that communication with the mobile station is started. The transmitting/receiving apparatus installed in the mobile station has a block for transmitting a signal to the base station by using spreading codes of the designated kind and number. The transmitting/receiving apparatus installed in the base station further has a block for detecting receiving quality values of the signal transmitted from the mobile station with respect to individual spreading codes used in the mobile station, a block for deciding whether or not the detected receiving quality values exceed a prescribed quality value, and a block for finally setting the kind and number of spreading codes to be used in the reverse link on the basis of the spreading codes for which the detected receiving quality values are determined to exceed the prescribed quality value.

11 Claims, 12 Drawing Sheets

FORWARD LINK

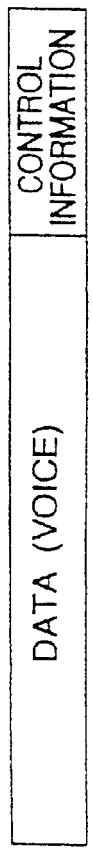

FIG. 12A 1ST SPREADING CODE — DATA (VOICE) | CONTROL INFORMATION

FIG. 12B 2ND SPREADING CODE — DATA (WITHOUT REAL TIME NATURE) | CONTROL INFORMATION

FIG. 12C 3RD SPREADING CODE — DATA (WITHOUT REAL TIME NATURE) | CONTROL INFORMATION

REVERSE LINK

FIG. 12D 4-TH SPREADING CODE — DATA (VOICE) | CONTROL INFORMATION

CONTAINING 2ND SPREADING CODE OF FORWARD LINK AND INFORMATION OF REQUEST FOR RE-TRANSMISSION OF 3RD SPREADING CODE

TRANSMITTING/RECEIVING APPARATUS USING A PLURALITY OF SPREADING CODES

BACKGROUND OF THE INVENTION

1. Field of the Invention

The present invention relates to a transmitting/receiving apparatus for performing transmission and reception by using a plurality of spreading codes and more particularly, to a transmitting/receiving apparatus which can increase and decrease the number of spreading codes in accordance with a grade of link quality.

2. Description of the Related Art

A conventional example of a transmitting/receiving apparatus for performing transmission and reception by using a plurality of spreading codes is shown in block diagram form in FIG. 1. When the transmitting/receiving apparatus is installed in a base station which can afford to use 20 spreading codes for reverse and forward links, respectively, at a time, it operates as will be described below. Since this base station can use 20 spreading codes at a time, it can accommodate 20 mobile stations using a single spreading code.

Firstly, the operation of a receiver of the transmitting/receiving apparatus will be described. By transferring a switch 202 to a down-converter 204, a receiving signal 203 received by an antenna 201 is inputted to the down-converter 204. In the down-converter 204, a carrier frequency of the receiving signal 203 is down-converted into an IF frequency, so that.the receiving signal 203 is converted into an IF signal 205. In a quadrature detector 206, the IF signal 205 from the down-converter 204 is quadrature-detected, so that the IF signal 205 is converted into an in-phase signal (I-ch) 207 and a quadrature signal (Q-ch) 208. The in-phase signal 207 and quadrature signal 208 are inputted to analog/digital converters (A/D converters) 213 and 214 via low-pass filters (LPF's) 209 and 210 so as to be converted into a digital in-phase signal 215 and a digital quadrature signal 216, respectively. The LPF's 209 and 210 are used to suppress frequency components in the in-phase and quadrature signals 207 and 208 which are ½ or more of a sampling frequency in the A/D converters 213 nd 214 and to shape waveforms of the in-phase and quadrature signals 207 and 208. The digital in-phase signal 215 and digital quadrature signal 216 delivered out of the A/D converters 213 and 214 are inputted to 20 demodulating units $217_1$ to $217_{20}$. First to twentieth codes 227, which are identical to the 20 spreading codes used during transmission, are generated by a reception code generator 226 and inputted one by one to the demodulating units $217_1$ to $217_{20}$. The demodulating unit $217_1$ includes despreaders $218_1$ and $219_1$ for multiplying the first code 227 which is identical to the first one of the 20 spreading codes used during transmission by the digital in-phase signal 215 and the digital quadrature signal 216, respectively, to reproduce two transmitting symbols $220_1$ and $221_1$, a decoder $222_1$ for decoding the two reproduced transmitting symbols to a bit signal $223_1$, and a frame decomposer $224_1$ for deriving information concerning the kind and the number of the spreading codes from a frame format contained in the bit signal $223_1$ and delivering receiving data 225 of the first code. The remaining demodulating units $217_2$ to $217_{20}$ are constructed similarly to the demodulating unit $217_1$.

Next, the operation of a transmitter of the transmitting/receiving apparatus will be described. In a frame assembler 229, transmitting data 228 is arranged in a frame format in accordance with the number of spreading codes used and a data amount of the transmitting data 228. In a transmission code generator 236, spreading codes 237 to be used are determined on the basis of information concerning the spreading codes and spreading code information owned by the base station which are sent from each of the demodulating units $217_1$ to $217_{20}$. Transmitting information pieces 230 delivered out of the frame assembler 229 are inputted to 20 modulating units $231_1$ to $231_{20}$. The modulating unit $231_1$ has a modulator $232_1$ for mapping the transmitting information to an in-phase signal (I-ch) $233_1$ and a quadrature signal (Q-ch) $234_1$, and spreaders $235_1$ and $235_2$ for spread-processing the in-phase signal $233_1$ and the quadrature signal $234_1$ by using one of the spreading codes 237. The remaining modulating units $231_2$ to $231_{20}$ are constructed similarly to the modulating unit 2311. Output signals 238 and output signals 239 from the modulating units $231_1$ to $231_{20}$ are added by adders 240 and 241, respectively. Output signals 242 and 243 of the adders 240 and 241 are converted from digital signals to analog signals by means of digital/analog converters (D/A converters) 244 and 245, respectively. Output signals 246 and 247 of the D/A converters 244 and 245 are inputted to a quadrature modulator 252 via LPF's 248 and 249, respectively, so that a base-band signal is converted into an IF signal 253. The LPF's 248 and 249 are adapted to eliminate higher harmonic components in the output signals 246 and 247 of the D/A converters 244 and 245 and to shape waveforms of the output signals 246 and 247 of the D/A converters 244 and 245. The IF signal is up-converted from the IF frequency to a carrier frequency by means of an up-converter 254 so as to be converted into a transmitting signal 255. The transmitting signal 255 is inputted to the antenna 201 via the switch 202 and transmitted to the mobile station.

In the aforementioned transmitting/receiving apparatus, however, transmitting data pieces are transmitted while being superimposed on each other by using a plurality of spreading codes and as compared to a transmitting/receiving apparatus adapted to transmit transmitting data by using a single spreading code, the service area is disadvantageously narrowed for the following reasons:

(1) Much transmitting power is required for transmission over the same distance; and (2) The transmitting distance is reduced when the transmitting power is made to be equal for the both types of apparatuses.

SUMMARY OF THE INVENTION

An object of the present invention is to provide a transmitting/receiving apparatus using a plurality of spreading codes which can expand the service area.

In a transmitting/receiving apparatus using a plurality of spreading codes according to the present invention, quality of a transmitting signal from a mobile station (hereinafter referred to as a reverse link signal) is examined in a base station and when the quality of the reverse link signal is bad, the number of spreading codes to be used is decreased but on the other hand, when the quality of the reverse link signal is good, the number of spreading codes to be used is increased. An upper limit of the number of spreading codes is set to a value prescribed by the system.

In a transmitting/receiving apparatus using a plurality of spreading codes according to the present invention, quality of a transmitting signal from a base station (hereinafter referred to as a forward link signal) is examined in a mobile station and when the quality of the forward link signal is bad, the number of spreading codes to be used is decreased but on the other hand, when the quality of the forward link signal is good, the number of spreading codes to be used is increased. An upper limit of the number of spreading codes is set to a value prescribed by the system.

More specifically, a first transmitting/receiving apparatus using a plurality of spreading codes according to the present invention is represented by transmitting/receiving apparatuses installed in a base station and a mobile station, respectively, to perform mutual transmission and reception by using a plurality of spreading codes, the transmitting/receiving apparatus installed in the base station comprises means for designating to the mobile station the kind and the number of spreading codes to be used in a reverse link from the mobile station to the base station through a forward link from the base station to the mobile station at the time that communication with the mobile station is started, the transmitting/receiving apparatus installed in the mobile station comprises means for transmitting a signal to the base station by using the spreading codes of the designated kind and number, and the transmitting/receiving apparatus installed in the base station further comprises means for detecting receiving quality values of the signal transmitted from the mobile station with respect to individual spreading codes used in the mobile station, means for deciding whether the detected receiving quality values exceed a prescribed quality value, and means for finally setting the kind and the number of spreading codes to be used in the reverse link on the basis of spreading codes for which the detected receiving quality values are determined to exceed the prescribed quality.

A second transmitting/receiving apparatus using a plurality of spreading codes according to the present invention is represented by transmitting/receiving apparatuses installed in a base station and a mobile station, respectively, to perform mutual transmission and reception by using a plurality of spreading codes, the transmitting/receiving apparatus installed in the base station comprises means for designating to the mobile station the kind and the number of spreading codes to be used in a forward link from the base station to the mobile station through the forward link at the time that communication with the mobile station is started, and means for transmitting a signal to the mobile station by using the spreading codes of the designated kind and number, and the transmitting/receiving apparatus installed in the mobile station comprises means for detecting receiving quality values of the signal transmitted from the base station with respect to individual spreading codes, means for deciding whether the detected receiving quality values exceed a prescribed quality value, and means for finally setting the kind and the number of spreading codes to be used in the forward link on the basis of spreading codes for which the detected receiving quality values are determined to exceed the prescribed quality value.

A third transmitting/receiving apparatus using a plurality of spreading codes according to the present invention is represented by a transmitting/receiving apparatus for performing transmission and reception by using a plurality spreading codes, and the transmitting/receiving apparatus comprises:

means for detecting quality values of a receiving signal with respect to individual spreading codes;

means for deciding whether or not the detected quality values exceed a prescribed quality value; and means for making a request for re-transmission of spreading codes for which the detected quality values are determined to be below the prescribed quality value.

A fourth transmitting/receiving apparatus using a plurality of spreading codes according to the present invention is represented by a transmitting/receiving apparatus for performing transmission and reception of voice and data by using a plurality of spreading codes, and the transmitting/receiving apparatus comprises:

means for detecting whether or not the voice is in a soundless state; and means for using spreading codes used in transmission of the voice for use in transmission of the data when the voice is determined to be in the soundless state.

A fifth transmitting/receiving apparatus using a plurality of spreading codes according to the present invention is represented by a transmitting/receiving apparatus for performing transmission and reception of voice required of real time nature and data not required of real time nature by using a plurality of spreading codes, and the transmitting/receiving apparatus comprises:

means for designating more spreading codes for transmission of the data than for transmission of the voice to a forward link from a base station to a mobile station; and means for transmitting a control signal for a request for re-transmission of the data by using a reverse link for voice from the mobile station to the base station.

A sixth transmitting/receiving apparatus using a plurality of spreading codes according to the present invention is represented by a transmitting/receiving apparatus for performing transmission and reception of voice required of real time nature and data not required of real time nature by using a plurality of spreading codes, and the transmitting/receiving apparatus comprises:

means for designating more spreading codes for transmission of the data than for transmission of the voice to a reverse link from a mobile station to a base station; and means for transmitting a control signal for a request for re-transmission of the data by using a forward link for voice from the base station to the mobile station.

BRIEF DESCRIPTION OF THE DRAWINGS

FIGS. 12A–12D illustrate frame formats used in the transmitting/receiving apparatus according to the seventh embodiment of the present invention.

DESCRIPTION OF THE PREFERRED EMBODIMENTS (First Embodiment)

A base station side transmitting/receiving apparatus according to a first embodiment of the present invention is installed in a base station of CDMA system. The base station can afford to use 20 spreading codes for reverse and forward links, respectively, at a time. Namely, the base station can accommodate 20 mobile stations each using a single spreading code.

Figure 1:
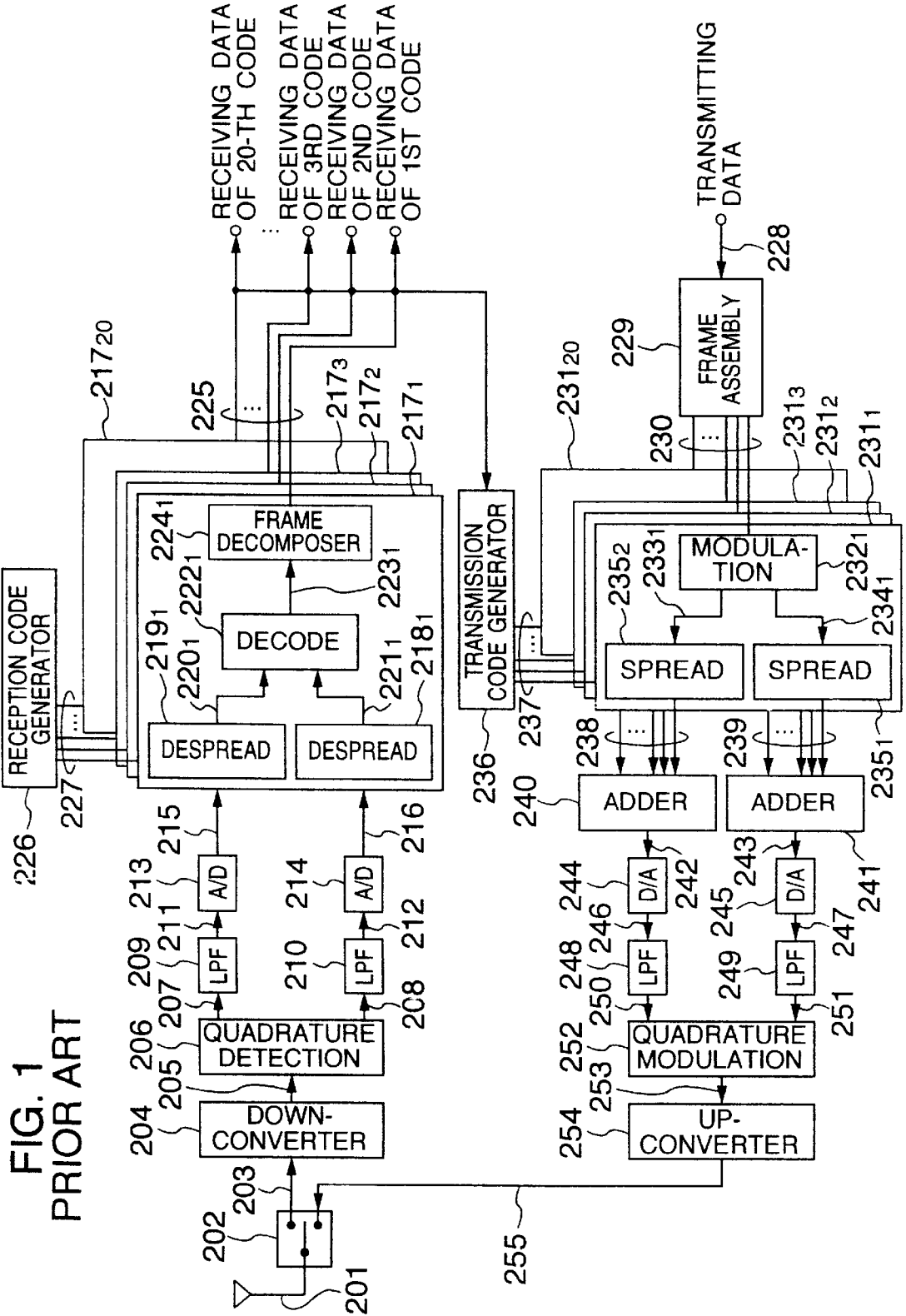
FIG. 1 is a block diagram showing a conventional example of a transmitting/receiving apparatus for performing transmission and reception by using a plurality of spreading codes.
Figure 2:
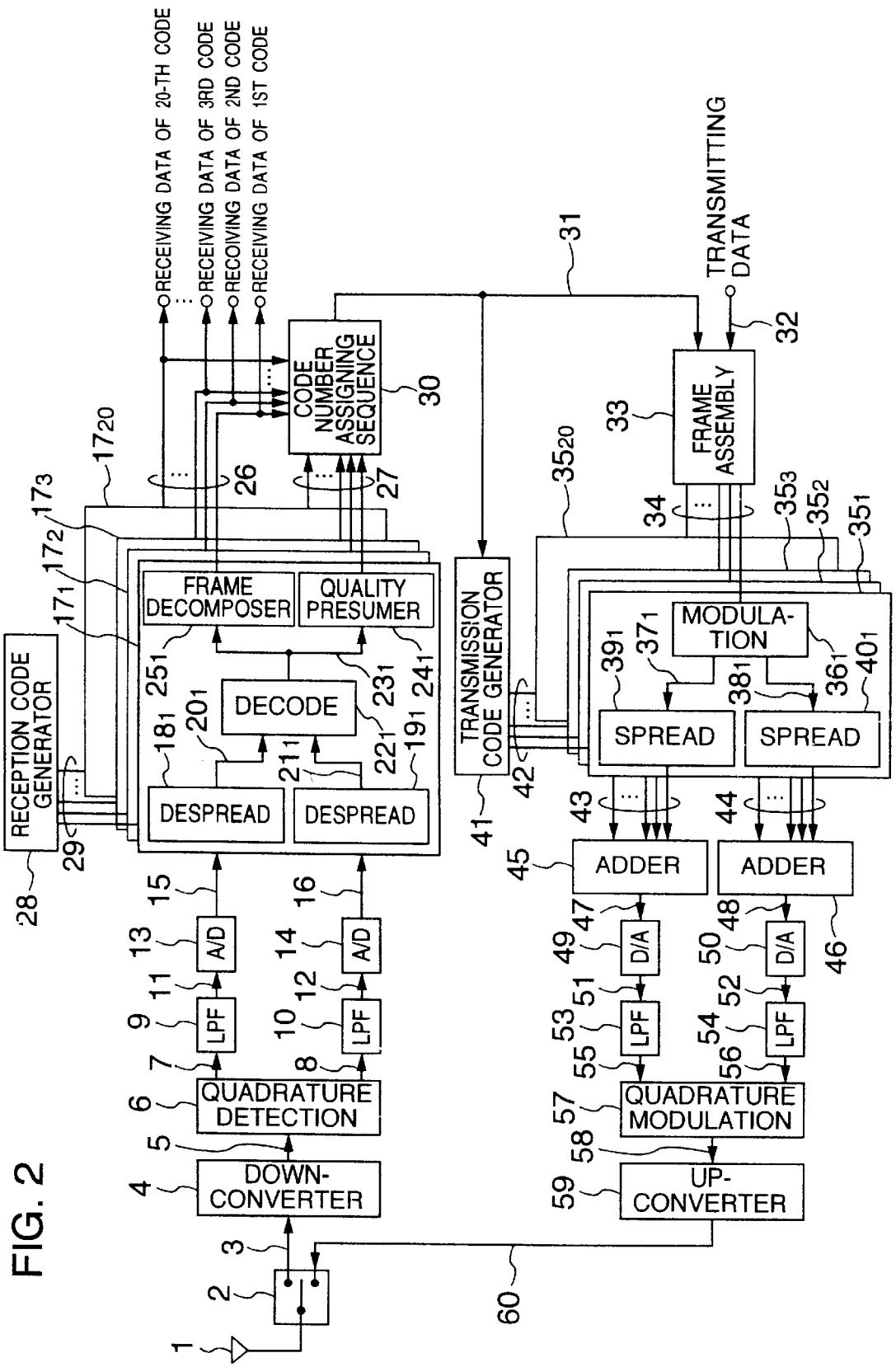
FIG. 2 is a block diagram showing the construction of a base station side transmitting/receiving apparatus according to a first embodiment of the present invention.

As shown in FIG. 2, a receiver of the base station side transmitting/receiving apparatus of the present embodiment comprises an antenna 1, a switch 2, a down-converter 4, a quadrature detector 6, two low-pass filters (LPF's) 9 and 10, two analog/digital converters (A/D converters) 13 and 14, twenty demodulating units $17_1$ to $17_{20}$, a reception code generator 28, and a code number assigning sequence processor 30. The demodulating unit $17_1$ includes two despreaders $18_1$ and $19_1$, a decoder $22_1$, a frame decomposer $25_1$, and a quality presumer $24_1$. The remaining demodulating units $17_2$ to $17_{20}$ are constructed similarly to the demodulating unit $17_1$.

A transmitter of the base station side transmitting/receiving apparatus of the present embodiment comprises a frame assembler 33, twenty modulating units $35_1$ to $35_{20}$, a transmission code generator 41, two adders 45 and 46, two digital/analog converters (D/A converters) 49 and 50, two low-pass filters (LPF's) 53 and 54, a quadrature modulator 57, and an up-converter 59. The modulating unit $35_1$ includes a modulator $36_1$ and two spreaders $39_1$ and $40_1$. Each of the remaining modulating units $35_2$ to $35_{20}$ is constructed similarly to the modulating unit 351.

The operation of the receiver of the base station side transmitting/receiving apparatus according to the present embodiment will be described. By transferring the switch 2 to the down-converter 4, a receiving signal 3 received by the antenna 1 is inputted to the down-converter 4. In the down-converter 4, a carrier frequency of the receiving signal 3 is down-converted to an IF frequency, so that the receiving signal 3 is converted into an IF signal 5. In the quadrature detector 6, the IF signal 5 from the down-converter 4 is quadrature-detected, so that the IF signal 5 is converted into an in-phase signal (I-ch) 7 and a quadrature signal (Q-ch) 8. The in-phase signal 7 and quadrature signal 8 are inputted to A/D converters 13 and 14 via the LPF's 9 and 10 so as to be converted into a digital in-phase signal 15 and a digital quadrature signal 16, respectively. The LPF's 9 and 10 are used to suppress frequency components in the in-phase and quadrature signals 7 and 8 which are ½ or more of a sampling frequency in the A/D converters 13 and 14 and to shape waveforms of the in-phase and quadrature signals 7 and 8. The digital in-phase signal 15 and the digital quadrature signal 16 delivered out of the A/D converters 13 and 14 are inputted to the 20 demodulating units $17_1$ to $17_{20}$. First to twentieth codes 29, which are identical to the 20 spreading codes used during transmission, are generated by the reception code generator 28 and inputted one by one to the demodulating units $17_1$ to $17_{20}$. In the despreaders $18_1$ and $19_1$ in the demodulating unit $17_1$, the first code 29 which is identical to the first one of the 20 spreading codes used during transmission is multiplied by the digital in-phase signal 15 and the digital quadrature signal 16, so that two transmitting symbols $20_1$ and $21_1$ are reproduced. The thus reproduced two transmitting symbols $20_1$ and $21_1$ are decoded to a bit signal $23_1$ by means of the decoder $22_1$. In the frame decomposer $25_1$, information regarding the kind and the number of the spreading codes is derived from a format contained in the bit signal $23_1$ and received data 26 of the first code is formed which in turn is delivered out of the frame decomposer $25_1$. The remaining demodulating units $17_2$ to $17_{20}$ operate similarly to the demodulating unit $17_1$.

In the quality presumer $24_1$, receiving quality (link quality) is examined using the bit signal 231. For examination of the receiving quality, the following methods can be enumerated.

(a) Determination using the phase likelihood of reproduced symbols after despread.

The receiving quality is examined on the basis of a phase difference between transmitting and receiving signals.

(b) Determination using the likelihood of reproduced symbols after despread.

The receiving quality is examined on the basis of a vector error (likelihood) between transmitting and receiving signals.

(c) Determination based on CRC

In the base station side transmitting/receiving apparatus of the present embodiment, the receiving quality is examined using the determination based on CRC.

In the code number assigning sequence processor 30, the information concerning the kind and the number of the spreading codes sent from the frame decomposers $25_1$ to $25_{20}$ of the decoding units $17_1$ to $17_{20}$ and the information concerning the receiving quality sent from the quality presumers $24_1$ to $24_{20}$ are used to perform assignment of the kind (contents) and the number of the spreading codes. Details of the assignment will be described hereinafter in connection with an operation to be described later carried out between the base station side transmitting/receiving apparatus and mobile station side transmitting/receiving apparatus according to the present embodiment.

The operation of the transmitter of the base station side transmitting/receiving apparatus of the present embodiment will be described. In the frame assembler 33, transmitting data 32 is arranged in a frame format in accordance with the number of the spreading codes (signal 31) and a data amount of the transmitting data 32. In the transmission code generator 41, spreading codes 42 to be used are determined on the basis of the kind and the number of the spreading codes (signal 31) sent from the code number assigning sequence processor 30. Transmitting information pieces 34 delivered out of the frame assembler 33 are inputted to the 20 modulating units $35_1$ to $35_{20}$. In the modulator $36_1$ of the modulating unit $351_1$ the transmitting information 34 is mapped to an in-phase signal (I-ch) $37_1$ and a quadrature signal (Q-ch) $38_1$. In the spreaders $39_1$ and $40_1$, one of the spreading codes 42 sent from the transmission code generator 41 is used to spread-process the in-phase signal $37_1$ and the quadrature signal $38_1$. The remaining modulating units $35_2$ to $35_{20}$ operate similarly to the modulating unit $35_1$. Output signals 43 and output signals 44 from the modulating units $35_1$ to $35_{20}$ are added by the adders 45 and 46, respectively. Output signals 47 and 48 of the adders 45 and 46 are converted from digital signals to analog signals by means of the D/A converters 49 and 50, respectively. Output signals 51 and 52 of the D/A converters 49 and 50 are inputted to the LPF's 53 and 54, respectively. Output signals 55 and 56 of the LPF's 53 and 54 are inputted to the quadrature modulator 57, so that a base-band signal is converted into an IF signal 58. The LPF's 53 and 54 are adapted to eliminate higher harmonic components in the output signals 51 and 52 of the D/A converters 49 and 50 and to shape waveforms of the output signals 51 and 52 of the D/A converters 49 and 50. The IF signal 58 is up-converted from the IF frequency to a carrier frequency by means of the up-converter 59 so as to be converted into a transmitting signal 60. The transmitting signal 60 is inputted to the antenna 1 via the switch 2 and transmitted to the mobile station.

Figure 3:
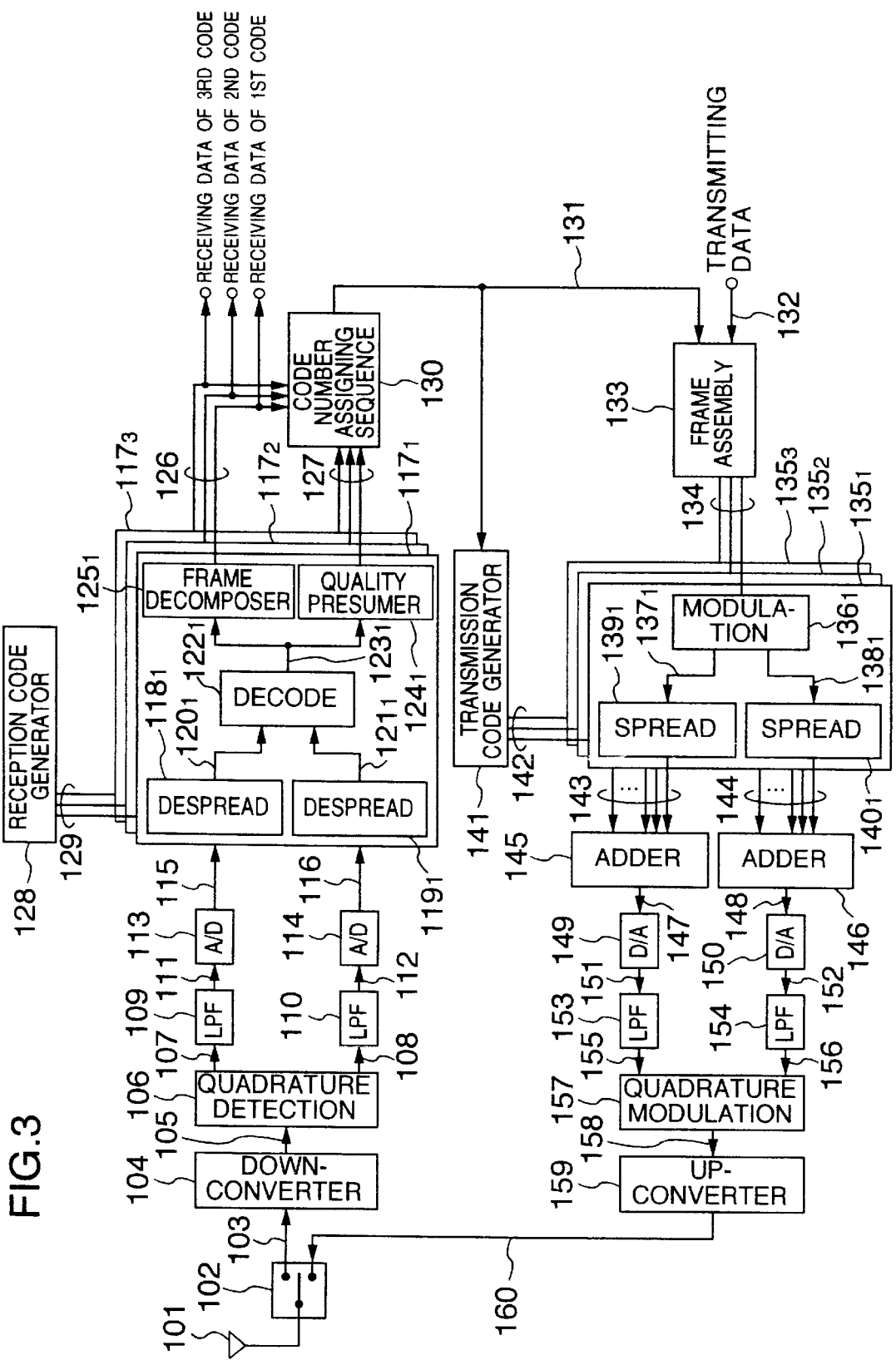
FIG. 3 is a block diagram showing the construction of a mobile station side transmitting/receiving apparatus according to the first embodiment of the present invention.

A mobile station side transmitting/receiving apparatus according to the first embodiment of the invention can afford to use maximally three spreading codes for reverse and forward links, respectively, at a time. As shown in FIG. 3, the mobile station side transmitting/receiving apparatus is constructed similarly to the aforementioned base station side transmitting/receiving apparatus according to the present embodiment but differs therefrom in the number of spreading codes to be used and the operation of a code number assigning sequence processor 130.

The operation of a receiver of the mobile station side transmitting/receiving apparatus according to the present embodiment will be described. By transferring a switch 102 to a down-converter 104, a receiving signal 103 received by an antenna 101 is inputted to the down-converter 104. In the down-converter 104, a carrier frequency of the receiving signal 103 is down-converted to an IF frequency, so that the receiving signal 103 is converted into an IF signal 105. In a quadrature detector 106, the IF signal 105 from the down-converter 104 undergoes quadrature detection so as to be converted into an in-phase signal (I-ch) 107 and a quadrature signal (Q-ch) 108. The in-phase signal 107 and the quadrature signal 108 are inputted to A/D converters 113 and 114 via LPF's 109 and 110 so as to be converted into a digital in-phase signal 115 and a digital quadrature signal 116, respectively. The LPF's 109 and 110 are used to suppress frequency components of the in-phase signal 107 and quadrature signal 108 which are ½ or more of a sampling frequency in the A/D converters 113 and 114 and to shape waveforms of the in-phase and quadrature signals 107 and 108. The digital in-phase signal 115 and the digital quadrature signal 116 delivered out of the A/D converters 113 and 114 are inputted to 3 demodulating units $117_1$ to $117_3$. First to third codes 129, which are identical to three of 20 spreading codes used during transmission, are generated by a reception code generator 128 and inputted one by one to the demodulating units $117_1$ to $117_3$. In despreaders $118_1$ and $119_1$ of the demodulating unit $117_1$, the digital in-phase signal 115 and the digital quadrature signal 116 are multiplied by the first code 129 which is identical to the first one of the 3 spreading codes to reproduce two transmitting symbols $120_1$ and $121_1$. The thus reproduced transmitting symbols $120_1$ and $121_1$ are decoded to a bit signal $123_1$ by means of a decoder $122_1$. In a frame decomposer $125_1$, information concerning the kind and the number of the spread codes is derived from a frame format contained in the bit signal $123_1$ and at the same time receiving data 126 of the first code is formed and delivered. The remaining decoding units $117_2$ and $117_3$ operate similarly to the decoding unit $117_1$.

In a quality presumer $124_1$, receiving quality (link quality) is examined using the bit signal $123_1$. For determination of the receiving quality, the following methods can be enumerated.

(a) Determination using the phase likelihood of reproduced symbols after despread.

(b) Determination using the likelihood of reproduced symbols after despread.

(c) Determination based on CRC.

In the mobile station side transmitting/receiving apparatus according to the present embodiment, the receiving quality is examined using the determination based on CRC.

In the code number assigning sequence processor 130, assignment of the kind and the number of the spreading codes is performed using the information concerning the kind and the number of the spreading codes which is sent from the frame decomposers $125_1$ to $125_3$ of the demodulating units $117_1$ to $117_3$ and the information concerning the receiving quality which is sent from the quality presumers $124_1$ to $124_3$. Details of the assignment will be described hereinafter in connection with an operation to be described later carried out between the base station side transmitting/receiving apparatus and the mobile station side transmitting/receiving apparatus according to the present embodiment.

The operation of a transmitter of the mobile station side transmitting/receiving apparatus according to the present embodiment will be described. In a frame assembler 133, transmitting data 132 is arranged in a frame format in accordance with the number of the spreading codes (signal 131) sent from the code number assigning sequence processor 130 and a data amount of the transmitting data 132. In a transmission code generator 141, spreading codes 142 to be used are determined on the basis of the kind and the number of the spreading codes (signal 131) sent from the code number assigning sequence processor 130. Transmitting information pieces 134 delivered out of the frame assembler 133 are inputted to 3 modulating units $135_1$ to $135_3$. In a modulator $136_1$ of the modulating unit $135_1$, the transmitting information 134 is mapped to an in-phase signal (I-ch) $137_1$ and a quadrature signal (Q-ch) $138_1$. Spreaders $139_1$ and $140_1$ use one of the 3 spreading codes 142 sent from the transmission code generator 141 to spread-process the in-phase and quadrature signals $137_1$ and $138_1$. The remaining modulating units $135_2$ and $135_3$ operate similarly to the modulating unit $135_1$. Output signals 143 and output signals 144 of the modulating units $135_1$ to $135_3$ are added by means of adders 145 and 146, respectively. Output signals 147 and 148 of the adders 145 and 146 are converted from digital signals to analog signals by means of D/A converters 149 and 150, respectively. Output signals 151 and 152 of the D/A converters 149 and 150 are inputted to LPF's 153 and 154, respectively. Output signals 155 and 156 of the LPF's 153 and 154 are inputted to a quadrature modulator 157, so that a base-band signal is converted into an IF signal 158. The LPF's 153 and 154 are adapted to eliminate higher harmonic components in the output signals 151 and 152 of the D/A converters 149 and 150 and to shape waveforms of the output signals 151 and 152 of the D/A converters 149 and 150. The IF signal 158 is up-converted from an IF frequency to a carrier frequency by means of an up-converter 159 so as to be converted into a transmitting signal 160. The transmitting signal 160 is inputted to the antenna 101 via the switch 102 and transmitted to the mobile station.

Figure 4:
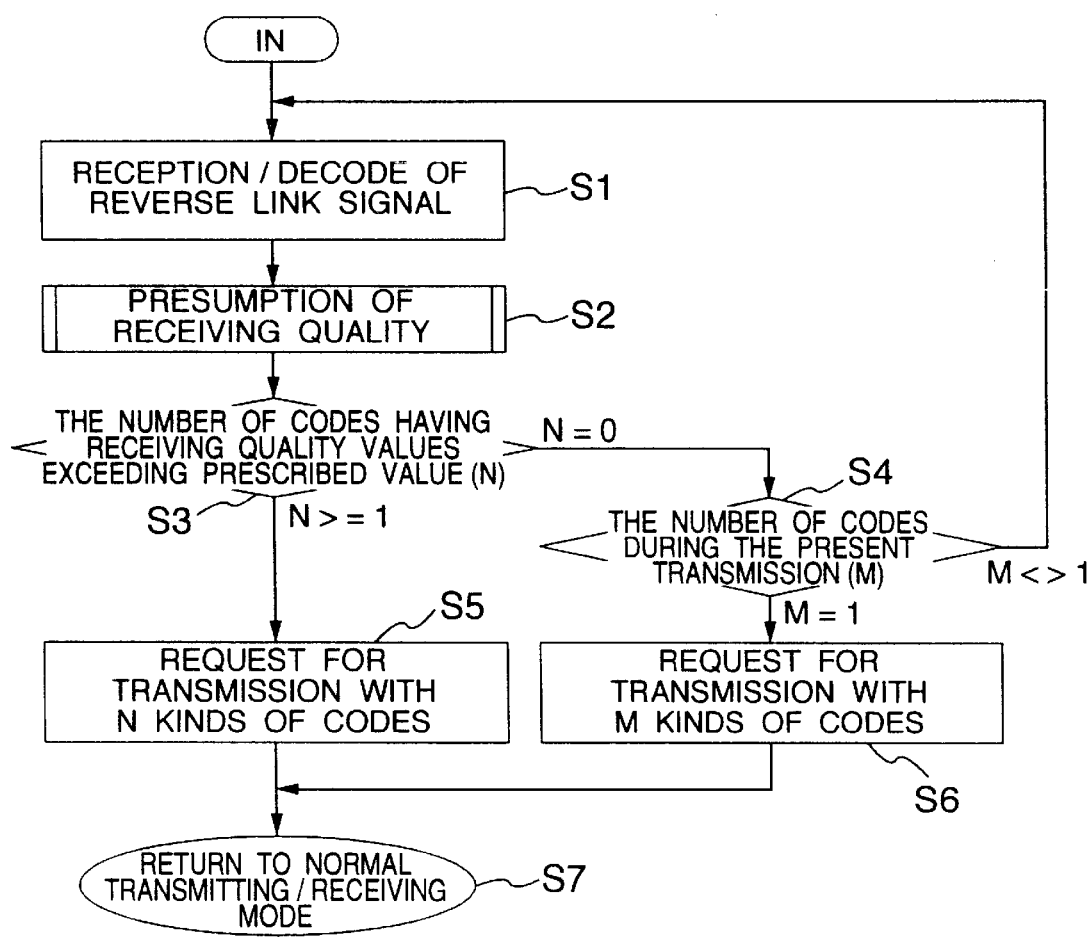
FIG. 4 is a flow chart for explaining the operation of the transmitting/receiving apparatus according to the first embodiment of the present invention.

Referring now to FIG. 4, a method of determining the number of spreading codes at the time that transmission is started in an operation between the base station side transmitting/receiving apparatus according to the present invention and the mobile station side transmitting/receiving apparatus according to the present invention will be described. Here, a description will be given of the case where the base station requests the mobile station to perform transmission using three kinds of spreading codes through a forward link but the description can be applied similarly to the case where the mobile station requests the base station to perform transmission using three kinds of spreading codes.

First Process

When the base station requests the mobile station to preform forward link transmission using three kinds of spreading codes, the kind and the number of the spreading codes are transmitted from the base station side transmitting/receiving apparatus to the mobile station side transmitting/receiving apparatus through the forward link. When the mobile station requests the base station to perform transmission using three kinds of spreading codes, the transmission request is received by the base station and the kind and the.number of the spreading codes are transmitted from the base station side transmitting/receiving apparatus to the mobile station side transmitting/receiving apparatus a forward link.

Second Process

In the mobile station side transmitting/receiving apparatus, the receiver applies despread and decoding processes to a receiving signal to reproduce transmitting symbols. The reproduced transmitting symbols are channel-decoded and the kind and the number of transmitted spreading codes are inputted to the code number assigning sequence processor 130. In the code number assigning sequence processor 130, transmitting data is assigned to a frame format in accordance with the kind and the number of the spreading codes. In the transmission code generator 128, maximally three spreading codes are generated on the basis of the kind and the number of spreading codes to be used in the next transmission. A transmitting signal is mapped to an in-phase signal and a quadrature signal which in turn are spread and then transmitted to the base station side transmitting/receiving apparatus.

Third Process

In the base station side transmitting/receiving apparatus, the transmitting signal (reverse link signal) using a plurality of spreading codes transmitted from the mobile station side transmitting/receiving apparatus is received and subjected to despread and decoding processes so as to reproduce transmitting symbols (step S1). Subsequently, the transmitting symbols reproduced every spreading code are subjected to the aforementioned receiving quality presumption process (step S2). A result of the receiving quality presumption obtained every spreading code is sent to the code number assigning sequence processor 30 and compared with a prescribed value (step S3). The kind and the number of spreading codes for which the result values of receiving quality presumption are determined to exceed the prescribed value are sent to the frame assembler 33. In the frame assembler 33, the kind and the number of the sent spreading codes are applied to the frame format (step S5). On the other hand, when the receiving quality is determined not to satisfy desired quality with respect to all of the spreading codes and a value of the number of spreading codes set during the previous transmission is larger than 1 (one), a predetermined number is subtracted from the previous set value and the number and the kind of residuary spreading codes are sent to the frame assembler 33. In the frame assembler 33, the kind and the number of the sent spreading codes are applied to the frame format. In this case, since the mobile station must cooperate with the base station side transmitting/receiving apparatus to renewedly set the number and the kind of the sent spreading codes, the aforementioned second process is repeated (step S4). When the receiving quality is determined not to satisfy desired quality with respect to all of the spreading codes and a value of the number of spreading codes set during the previous transmission is 1, the kind (contents) of the spreading code is sent to the frame assembler 33. In the frame assembler 33, the kind and the number of the sent spreading code are applied to the frame format (step S4).

Fourth Process

In the mobile station side transmitting/receiving apparatus, the receiver receives the forward link signal transmitted from the base station side transmitting/receiving apparatus and applies despread and decoding processes to the receiving signal to reproduce transmitting symbols. The reproduced transmitting symbols are channel-decoded and the kind and the number of sent spreading codes are inputted to the code number assigning sequence processor 130. In the code number assigning sequence processor 130, transmitting data is assigned to the frame format in accordance with the kind and the number of the spreading codes. In the transmission code generator 128, maximally three spreading codes are generated on the basis of the kind and the number of spreading codes to be used in the next transmission. The transmitting signal is mapped to an in-phase signal and a quadrature signal which in turn are spread and then transmitted to the base station side transmitting/receiving apparatus (steps S5 and 56). Subsequently, transmission/reception is carried out using the kind and the number of the spreading codes (step 7).

As described above, by taking into account the fact that the distance over which the electric wave delivered at the same power can propagate is shorter in the case of transmission effected using a plurality of spreading codes than in the case of transmission effected using a single spreading code, the presumption of the receiving quality is performed every spreading code in the base station side transmitting/receiving apparatus to determine the number of spread codes assigned to a reverse link from the mobile station to the base station and thereafter transmission/reception is carried out in the operation effected between the base station side transmitting/receiving apparatus according to the present embodiment and the mobile station side transmitting/receiving apparatus. Through this, a great number of signals can be transmitted while satisfying the prescribed receiving quality.

(Second Embodiment)

In the transmitting/receiving apparatus according to the first embodiment described as above, the quality of a receiving signal from the mobile station is examined in the base station at the time that communication between the base station and the mobile station is started to finally set the kind and the number of spreading codes to be assigned. But in mobile communication, the mobile station moves to cause the distance between the base station and the mobile station to change and in consequence, the communication quality changes every moment. In addition, as the location where the mobile station is present changes, the communication quality also changes.

Figure 5:
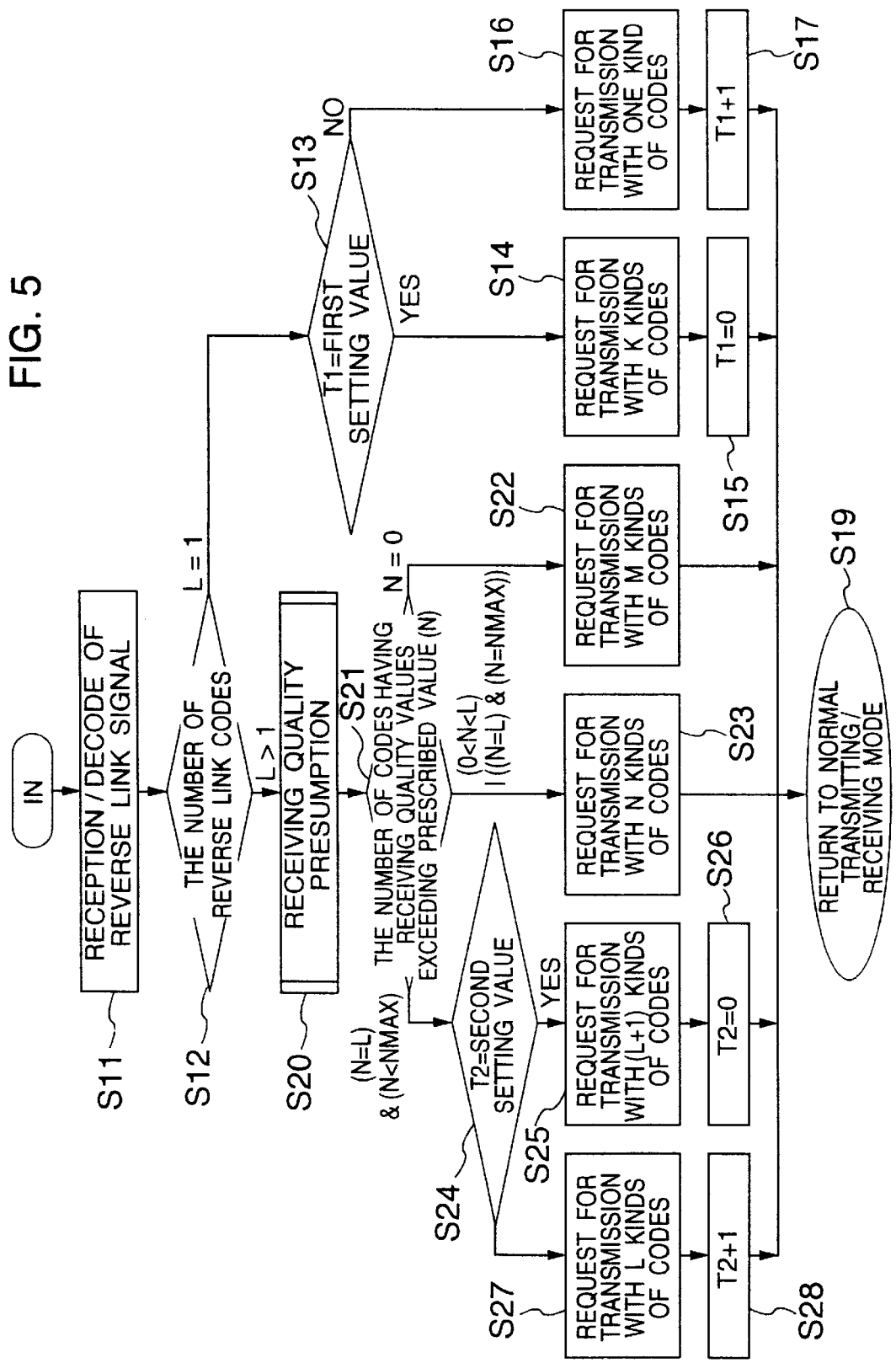
FIG. 5 is a flow chart for explaining the operation of a transmitting/receiving apparatus according to a second embodiment of the present invention.

In a transmitting/receiving apparatus according to a second embodiment of the present invention, the kind and the number of spread codes are assigned in accordance with the communication quality which changes every moment and hence the optimum kind and number of spreading codes can be assigned adaptively in the base station. A base station side transmitting/receiving apparatus and a mobile station side transmitting/receiving apparatus according to the second embodiment of the present invention are constructed similarly to the previously-described base station side transmitting/receiving apparatus and mobile station side transmitting/receiving apparatus according to the first embodiment and therefore, the operation of the base station side transmitting/receiving apparatus and mobile station side transmitting/receiving apparatus according to the second embodiment of the present invention will be described with reference to a flow chart shown in FIG. 5.

First Process

In the base station, a reverse link signal from the mobile station is received at a time point during communication and the receiving signal is subjected to despread and decoding processes to reproduce transmitting symbols (step S11). When the number (L) of spreading codes to be assigned to the reverse link is 1, the program proceeds to a second process to be described below and when the number (L) of spreading codes to be assigned is larger than 2, the program proceeds to a third process to be described later (step S12).

Second Process

When a predetermined time (first setting value) has elapsed following determination that the number (L) of spreading codes to be assigned to the reverse link is 1 (namely, when counter value T1=first setting value), transmission is requested with the kind of spreading codes changed to K and thereafter, the counter is reset (steps S13 to S15). On the other hand, when the predetermined time (first setting value) has not elapsed following determination that the number (L) of spreading codes to be assigned to the reverse link is 1, transmission is requested with the kind of spreading codes kept to be one and thereafter the counter is incremented (steps S16 and S17). Subsequently, the program proceeds to the normal transmitting/receiving mode and the procedure ends (step S19).

Third Process

Presumption of receiving quality using determination based on, for example, CRC is performed every spreading code (step S20) to determine the number (N) of spread codes having receiving quality values which exceed a prescribed value. When the determined number (N) is 0, transmission is requested with the kind of spreading codes kept to be a preset value (M) (steps S21 and S22). When the determined number (N) is larger than 0 and is smaller than the number (L) of spreading codes to be assigned to the reverse link (namely, when 0<N<L) or when the determined number (N) equals the number (L) of spreading codes to be assigned to the reverse link and equals a maximum (Nmax) of the number of spreading codes to be assigned to the reverse link (namely, when N=L and N=Nmax), transmission is requested with the kind (for example, when the spreading code is of an M series, a length of the M series set to N (steps S21 and S23). Further, when the determined number (N) is equal to the number (L) of spreading codes to be assigned to the reverse link and is smaller than the maximum (Nmax) of the number of spreading codes to be assigned to the reverse link (namely, when N=L and N<Nmax), a process as below is carried out. More particularly, when a predetermined time (second setting value) has elapsed following setting of the number of spreading codes to be assigned to L (namely, when counter value T2=second setting value), transmission is requested with the kind of spreading codes changed to L+1 (steps S21, S24 and S25) and thereafter the counter is reset (step S26). On the other hand, when the predetermined time (second setting value) has not elapsed following setting of the number of spreading codes to be assigned to L, transmission is requested with the kind of spreading codes kept to be L (steps S21, S24 and S27) and thereafter, the counter is incremented (step S28). After the above steps S22, S23, S26 and S28 end, the program proceeds to the normal transmitting/receiving mode and the procedure ends (step S19).

As described above, in the transmitting/receiving apparatus according to the second embodiment of the present invention, for the purpose of maintaining the predetermined communication quality against even a change in reverse link quality due to movement of the mobile station during communication, the communication quality of reverse link is presumed in the base station and the kind and the number of spreading codes are adaptively controlled in accordance with the presumed communication quality. Further, the time required for communication can be decreased by increasing the kind and the number of spreading codes to be assigned when the link quality is improved.

(Third Embodiment)

Figure 6:
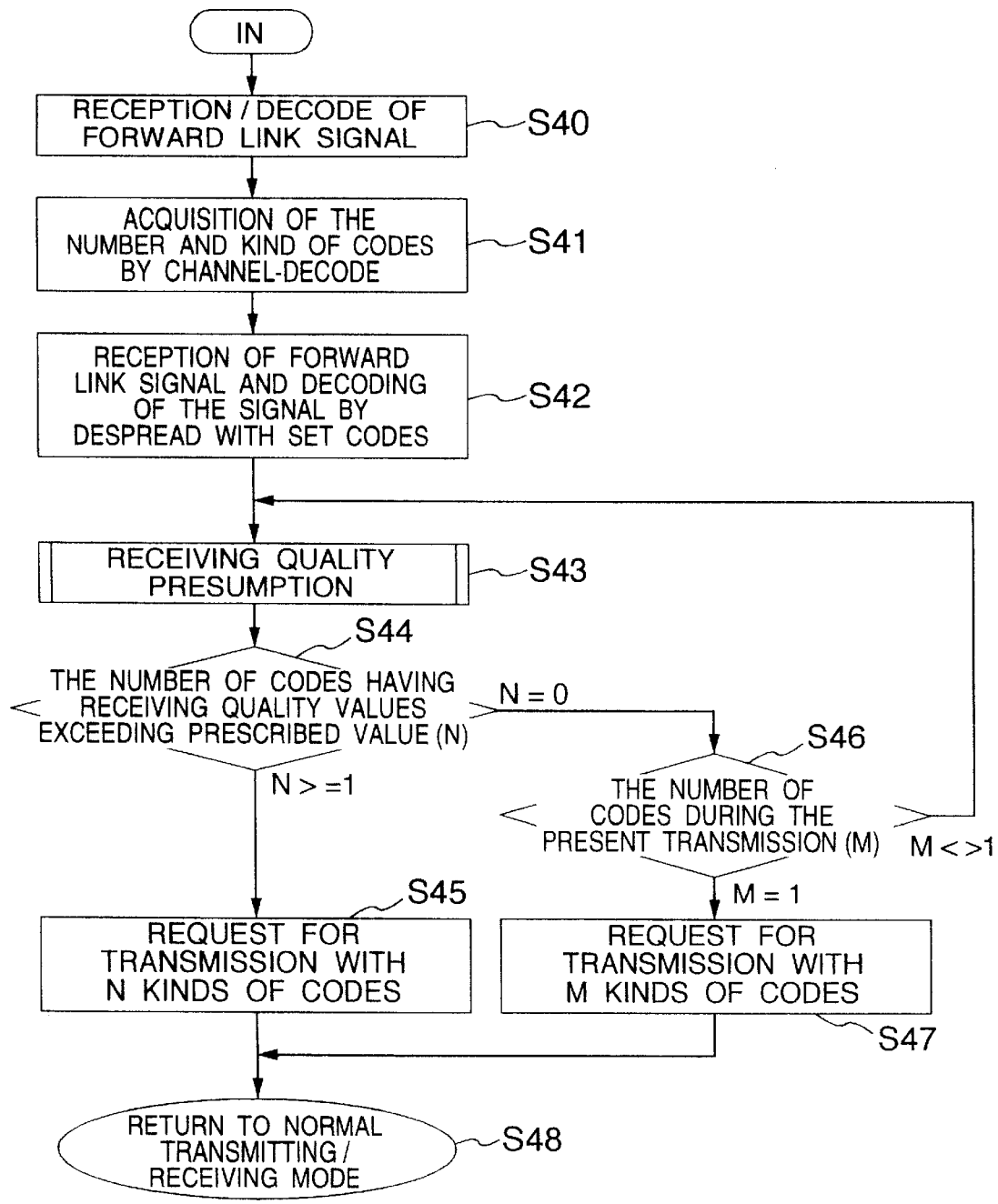
FIG. 6 is a flow chart for explaining the operation of a transmitting/receiving apparatus according to a third embodiment of the present invention.

A base station side transmitting/receiving apparatus and a mobile station side transmitting/receiving apparatus according to a third embodiment of the present invention are constructed similarly to the previously-described base station side transmitting/receiving apparatus and mobile station side transmitting/receiving apparatus according to the first embodiment and therefore, the operation of the base station side transmitting/receiving apparatus and mobile station side .transmitting/receiving apparatus according to the third embodiment will be described with reference to a flow chart shown in FIG. 6. In an operational example shown in the flow chart, forward link transmission from the base station to the mobile station is requested using three kinds of spreading codes but a request for transmission from the mobile station to the base station using three kinds of spreading codes can be fulfilled similarly.

First Process

The kind and the number of spreading codes are transmitted from the base station to the mobile station through a forward link. But in the case where the mobile station makes a request, the transmission request from the base station is first received and thereafter, the kind and the number of spreading codes are transmitted from the mobile station to the base station through a reverse link.

Second Process

In the mobile station, the forward link signal from the base station is received and thereafter, the receiving signal is subjected to despread and decoding processes to reproduce transmitting symbols (step S40). Subsequently, the mobile station carries out channel-decoding to obtain the number and the kind of spreading codes transmitted from the base station (step S41) and waits for the next forward link signal.

Third Process

In the base station, the kind and the number of spreading codes transmitted to the mobile station are used to transmit a transmitting signal to the mobile station through the forward link.

Fourth Process

In the mobile station, the forward link signal from the base station is received and the receiving signal is subjected to despread and decoding processes to reproduce transmitting symbols (step S42). Thereafter, in the mobile station, receiving quality presumption using, for example, the determination based on CRC is carried out every spreading codes (step S43). Results of the presumption are sent to the code number assigning sequence processor 130 (see FIG. 3). In the code number assigning sequence processor 130, the kind and the number of spreading codes having receiving quality values which exceed a prescribed value are determined and the results are sent to the frame assembler 133. In the frame assembler 133, when the number (N) of spreading codes having receiving quality values exceeding the prescribed value is one or more, a request for transmission using N kinds of spreading codes is transmitted to the base station through the reverse link (steps S44 and S45). On the other hand, the receiving quality values are below the prescribed value with respect to all of the spreading codes, the number (M) of spreading codes to be transmitted presently is determined by subtracting a predetermined number from the previous setting number and a request for transmission using spreading codes of the determined number and kind is transmitted to the base station through the reverse link (steps S44 and S46). At that time, when the determined number (M) of spreading codes to be transmitted presently is 1, a request for transmission using one kind of spreading code is transmitted to the base station through the reverse link (steps S44 and S47).

Fifth Process

In the base station, a forward link signal from the mobile station is received and the receiving signal is subjected to despread and decoding processes to reproduce transmitting symbols. Thereafter, channel-decoding is carried out and when a resetting request is raised, a resetting value is designated and then the program proceeds to the third process. On the other hand, in the absence of a resetting request from the mobile station, the program proceeds to the normal transmitting/receiving mode using the kind and the number of spreading codes which are designated by the mobile station (step S48).

As described above, in the transmitting/receiving apparatus according to the third embodiment, by taking into account the fact that the distance over which the electric wave delivered at the same power can propagate is shorter in the case of transmission effected using a plurality of spreading codes than in the case of transmission effected using a single spreading code, the mobile station presumes the quality of the forward link and determines the number of spreading codes assigned to the forward link and then transmission/reception is carried out between the base station and the mobile station. In consequence, a great number of signals can be transmitted while satisfying the prescribed link quality.

(Fourth Embodiment)

In the transmitting/receiving apparatus according to the third embodiment, the quality of the receiving signal from the base station is examined in the mobile station at the time that communication between the base station and the mobile station is started to finally set the kind and the number of spreading codes to be assigned. But, in mobile communication, the mobile station moves to cause the distance between the base station and the mobile station to change and in consequence, the communication quality changes every moment. In addition, as the location where the mobile station is present changes, the communication quality also changes.

Figure 7:
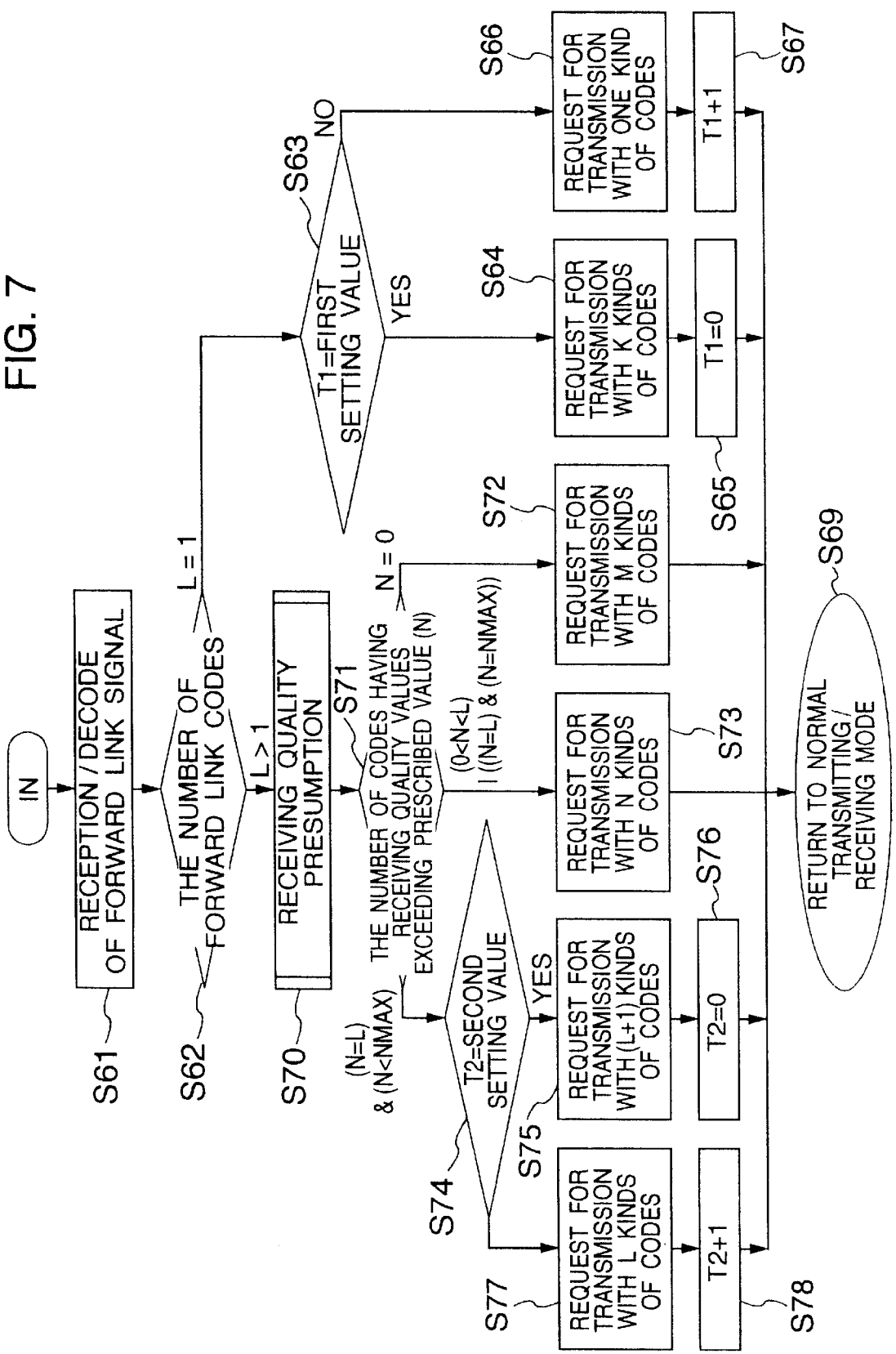
FIG. 7 is a flow chart for explaining the operation of a transmitting/receiving apparatus according to a fourth embodiment of the present invention.

In a transmitting/receiving apparatus according to the fourth embodiment of the present invention, the kind and the number of spreading codes are assigned in accordance with communication quality which changes every moment and hence the optimum kind and number of spreading codes can be assigned adaptively in the mobile station. A base station side transmitting/receiving apparatus and a mobile station side transmitting/receiving apparatus according to the fourth embodiment of the present invention are constructed similarly to the previously-described base station side transmitting and mobile station side transmitting/receiving apparatus according to the first embodiment and therefore, the operation of the base station side transmitting/receiving apparatus and mobile station side transmitting/receiving apparatus according to the fourth embodiment of the invention will be described hereunder with reference to a flow chart shown in FIG. 7.

First Process

In the mobile station, a forward link signal from the base station is received at a time point during communication and the receiving signal is subjected to despread and decoding processes to reproduce transmitting symbols (step S61). When the number (L) of spreading codes to be assigned to the forward link is 1, the program proceeds to a second process to be described below and when the number (L) of spreading codes to be assigned is larger than 2, the program proceeds to a third process to be described later (step S62).

Second Process

When a predetermined time (first setting value) has elapsed following determination that the number (L) of spreading codes to be assigned to the forward link is 1 (namely, when counter value T1=first setting value), transmission is requested with the kind of spreading codes changed to K and thereafter, the counter is reset (steps S63 to S65). On the other hand, when the predetermined time (first setting value) has not elapsed following determination that the number (L) of spreading codes to be assigned to the forward link is 1, transmission is requested with the kind of spreading codes kept to be one and thereafter, the counter is incremented (steps S66 and S67). Subsequently, the program proceeds to the normal transmitting/receiving mode and the procedure ends (step S69).

Third Process

Presumption of receiving quality using determination based on, for example, CRC is performed every spreading code (step S70) to determine the number (N) of spreading codes having receiving quality values which exceed a prescribed value. When the determined number (N) is 0, transmission is requested with the kind of spreading codes kept to be a preset value (M) (steps S71 and S72). When the determined number (N) is larger than 0 and is smaller than the number (L) of spreading codes to be assigned to the forward link (namely, when 0<N<L) or when the determined number (N) equals the number (L) of spreading codes to be assigned to the forward link and equals a maximum (Nmax) of the number of spreading codes to be assigned to the forward link (namely, when N=L and N=Nmax), transmission is requested with the kind of spreading codes set to N (steps S71 and S73). Further, when the determined number (N) is equal to the number (L) of spreading codes to be assigned to the forward link and is smaller than the maximum (Nmax) of the number of spreading codes to be assigned to the forward link (namely, when N=L and N<Nmax), a process as below is carried out. More particularly, when a predetermined time (second setting value) has elapsed following setting of the number of spreading codes to be assigned to L (namely, when counter value T2=second setting value), transmission is requested with the kind of spreading codes changed to L+1 (steps S7i, S74 and S75) and thereafter the counter is reset (step S76). On the other hand, when the predetermined time (second setting value) has not elapsed following setting of the number of spreading codes to be assigned to L, transmission is requested with the kind of spreading codes kept to be L (steps S71, S74 and S77) and thereafter the counter is incremented (step S78). After the above steps S72, S73, S76 and S78 end, the program proceeds to the normal transmitting/receiving mode and the procedure ends (step S69).

As described above, in the transmitting/receiving apparatus according to the fourth embodiment of the present invention, for the purpose of maintaining the predetermined communication quality against a change in reverse link quality due to movement of the mobile station during communication, the communication quality of forward link is presumed in the mobile station and the kind and the number of spreading codes are adaptively controlled in accordance with the presumed communication quality. The time required for communication can be decreased by increasing the kind and the number of spreading codes to be assigned when the link quality is improved.

(Fifth Embodiment)

In the transmitting/receiving apparatus for performing transmission and reception by using a plurality of spreading codes, only signals transmitted by using some spreading codes cannot sometimes satisfy the quality condition depending on link conditions and the performance of spreading codes. In this case, the efficiency will be degraded greatly if a request for re-transmission is made with respect to all spreading codes.

Figure 8:
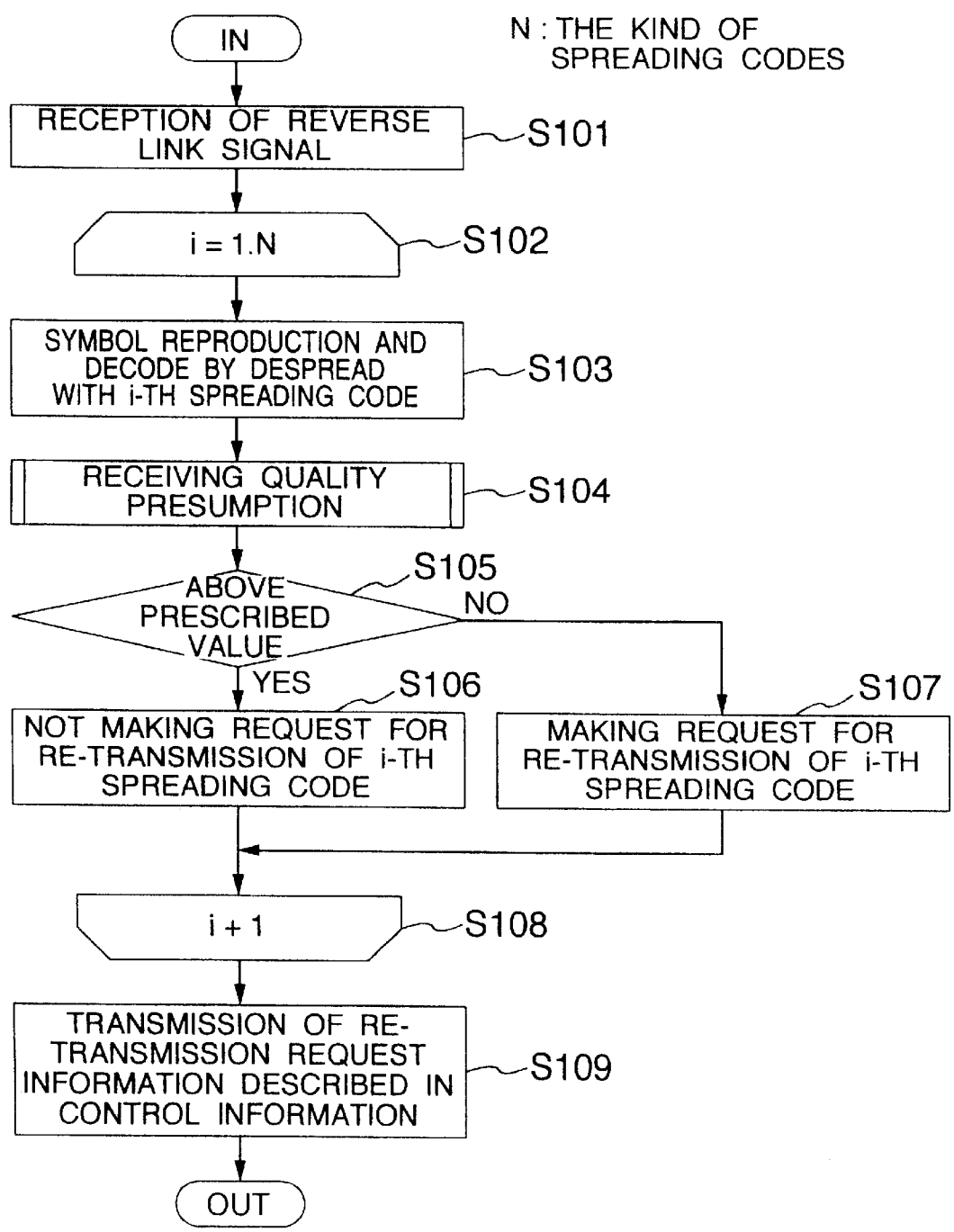
FIG. 8 is a flow chart for explaining the operation of a transmitting/receiving apparatus according to a fifth embodiment of the present invention.

Thus, in a transmitting/receiving apparatus according to a fifth embodiment of the present invention, it is decided every spreading code whether a re-transmission request is to be made and only when it is determined that the re-transmission must be performed, a re-transmission request is made to a transmission partner. A base station side transmitting/receiving apparatus and a mobile station side transmitting/receiving apparatus according to the fifth embodiment of the invention are constructed similarly to the previously-described base station side transmitting/receiving apparatus and mobile station side transmitting/receiving apparatus according to the first embodiment and therefore, the operation of the base station side transmitting/receiving apparatus and mobile station side transmitting/receiving apparatus according to the fifth embodiment will be described hereunder with reference to a flow chart shown in FIG. 8. Although control carried out in the base station will be described below, the following description may meet control performed in the mobile station if the base station is replaced with the mobile station and the reverse link is replaced with the forward link.

In the base station side transmitting/receiving apparatus, a reverse link signal transmitted from the mobile station side transmitting/receiving apparatus by using a plurality of spreading codes (first to N-th spreading codes) is received (step 101). After the receiving signal is subjected to despread and decoding processes every spreading code to reproduce transmitting symbols, receiving quality presumption based on CRC is carried out (steps S102 to S104). Thereafter, it is decided every spreading code whether the presumed receiving quality values exceed a prescribed value and a re-transmission request is not made with respect to spreading codes for which the presumed receiving quality values exceed the prescribed value but a re-transmission request is made with respect to spreading codes for which the presumed receiving quality values are smaller than the prescribed value (steps S105 to S108). Thereafter, information as to whether or not the re-transmission request is made is described every spreading code in control information and is sent to the mobile station (step S109).

As described above, in the transmitting/receiving apparatus according to the present embodiment, the receiving link quality is presumed every spreading code and the re-transmission request is made every spreading code, thereby improving the transmission efficiency.

(Sixth Embodiment)

When voice and data are transmitted and received using a plurality of spreading codes, there arises in voice information a soundless state in which no conversation is made. Since no information is transmitted in the soundless state, the soundless state consumes time in vain.

Thus, in a base station side transmitting/receiving apparatus and a mobile station side transmitting/receiving apparatus according to a sixth embodiment of the present invention, data is transmitted during a period of the soundless state to improve the transmission efficiency. The base station side transmitting/receiving apparatus and mobile station side transmitting/receiving apparatus according to the sixth embodiment of the present invention are constructed similarly to the previously-described base station side transmitting/receiving apparatus and mobile station side transmitting/receiving apparatus according to the first embodiment and therefore, the operation of the base station side transmitting/receiving apparatus and mobile station side transmitting/receiving apparatus according to the sixth embodiment will be described hereunder with reference to flow charts shown in FIGS. 9 and 10.

Although an instance where a first spreading code is assigned to voice or data and a second spreading code is assigned to data and transmission from the base station to the mobile station is effected through a forward link will be described below, the following description may meet an instance where transmission from the mobile station to the base station is effected similarly if the base station is replaced with the mobile station and the forward link is replaced with a reverse link.

Figure 9:
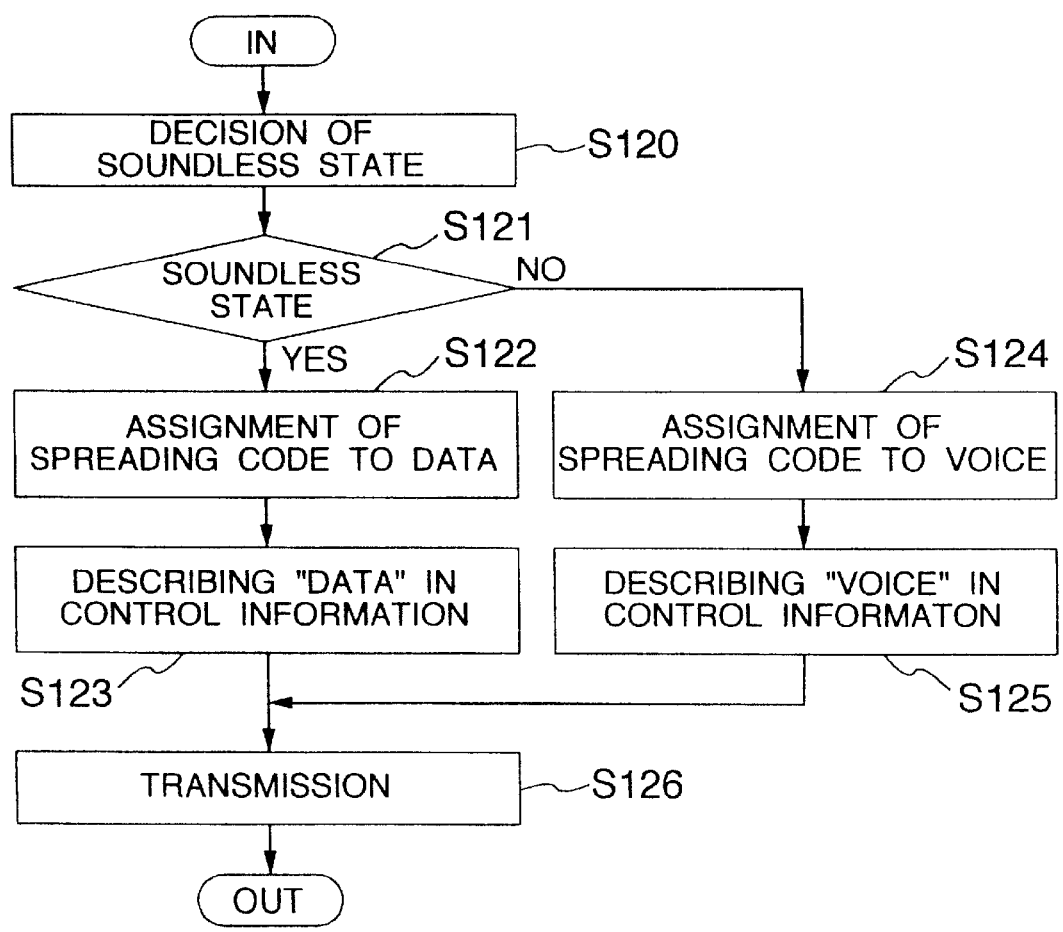
FIG. 9 is a flow chart for explaining the operation of a transmitting/receiving apparatus according to a sixth embodiment of the present invention.

In the base station side transmitting/receiving apparatus, it is decided whether a soundless state occurs in a reverse link signal transmitted from the mobile station side transmitting/receiving apparatus (step S120 in FIG. 9). In the absence of the soundless state, after the first spreading code is assigned to voice, "voice" is described in control information and transmitted to the mobile station (steps S121, S124 to S126). On the other hand, in the soundless state, after the first spreading code is assigned to data, "data" is described in the control information and transmitted to the mobile station (steps S121 to S123, S126).

Figure 10:
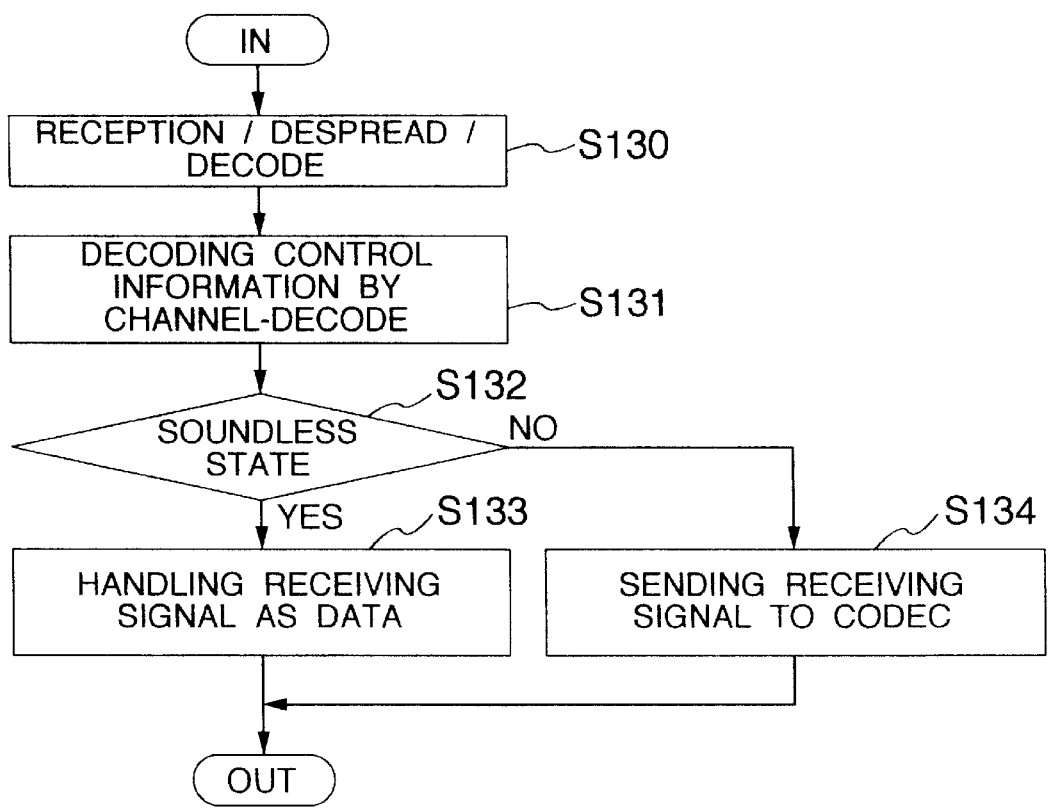
FIG. 10 is a flow chart for explaining the operation of the transmitting/receiving apparatus according to the sixth embodiment of the present invention.

In the mobile station side transmitting/receiving apparatus, a forward link signal transmitted from the base station side transmitting/receiving apparatus is received and the receiving signal is subjected to despread and decoding processes to reproduce transmitting symbols (step S130 in FIG. 10). Also, channel-decoding is effected to decode the control information (step S131). When the decoded control information is described with "voice", the receiving signal is sent to a voice codec (step S132 and S134). On the other hand, the decoded control information is described with "data", the receiving signal is handled as data (steps S132 and S133).

(Seventh Embodiment)

When information requiring real time nature such as voice and data not requiring real time nature are transmitted and received using a plurality of spreading codes, the data not requiring real time nature is sometimes transmitted/received through only one of a forward link from the base station to the mobile station and a reverse link from the mobile station to the base station. Further, when desired quality of receiving data cannot be maintained, a re-transmission request is made. In this case, for example, when voice is transmitted using one kind of spreading code and data not requiring real time nature is transmitted using two kinds of spreading codes through only a reverse link or a forward link, it is necessary to transmit control information such as a request for data re-transmission through the forward link or the reverse link even if the data is transmitted through only a oneway link of reverse link or forward link, as will be described below.

(1) In the Case of Transmission of Voice and Data from Base Station to Mobile Station ① forward link:
spreading codes for voice . . . one kind (first spreading code is assigned)
spreading codes for data . . . two kinds (second and third spreading codes are assigned)

② reverse link:
spreading codes for voice . . . one kind (fourth spreading code is assigned)
control information for data . . . one kind (fifth spreading code is assigned)

(2) In the Case of Transmission of Voice and Data from Mobile Station to Base Station ① forward link:
spreading codes for voice . . . one kind (first spreading code is assigned)
control information for data . . . one kind (second spreading code is assigned)

② reverse link:
spreading codes for voice . . . one kind (third spreading code is assigned)
spreading codes for data . . . two kinds (fourth and fifth spreading codes are assigned)

In the transmitting/receiving apparatus according to the seventh embodiment of the invention, the number of necessary spreading codes is reduced by carrying out the following processing.

(1) In the case of transmission of data through only the forward link, spreading codes of the reverse link for transmission of data control information are unneeded by making a re-transmission request through the reverse link for voice.

(2) In the case of transmission of data through only the reverse link, spreading codes of the forward link for transmission of data control information are unneeded by making a re-transmission request through the forward link for voice.

This is concreted as follows.

(1) In the Case of Transmission of Voice and Data from Base Station to Mobile Station ① forward link:
spreading codes for voice . . . one kind (first spreading code is assigned)
spreading codes for data . . . two kinds (second and third spreading codes are assigned)

② reverse link:
spreading codes for voice . . . one kind (fourth spreading code is assigned)
control information for data . . . mixed with voice for transmission (no spreading code is assigned)

(2) In the Case of Transmission of Voice and Data from Mobile Station to Base Station ① forward link:
spreading codes for voice . . . one kind (first spreading code is assigned)
control information for data . . . mixed with voice for transmission (no spreading code is assigned)

② reverse link:
spreading codes for voice . . . one kind (third spreading code is assigned)
spreading codes for data . . . two kinds (fourth and fifth spreading codes are assigned)

Figure 11:
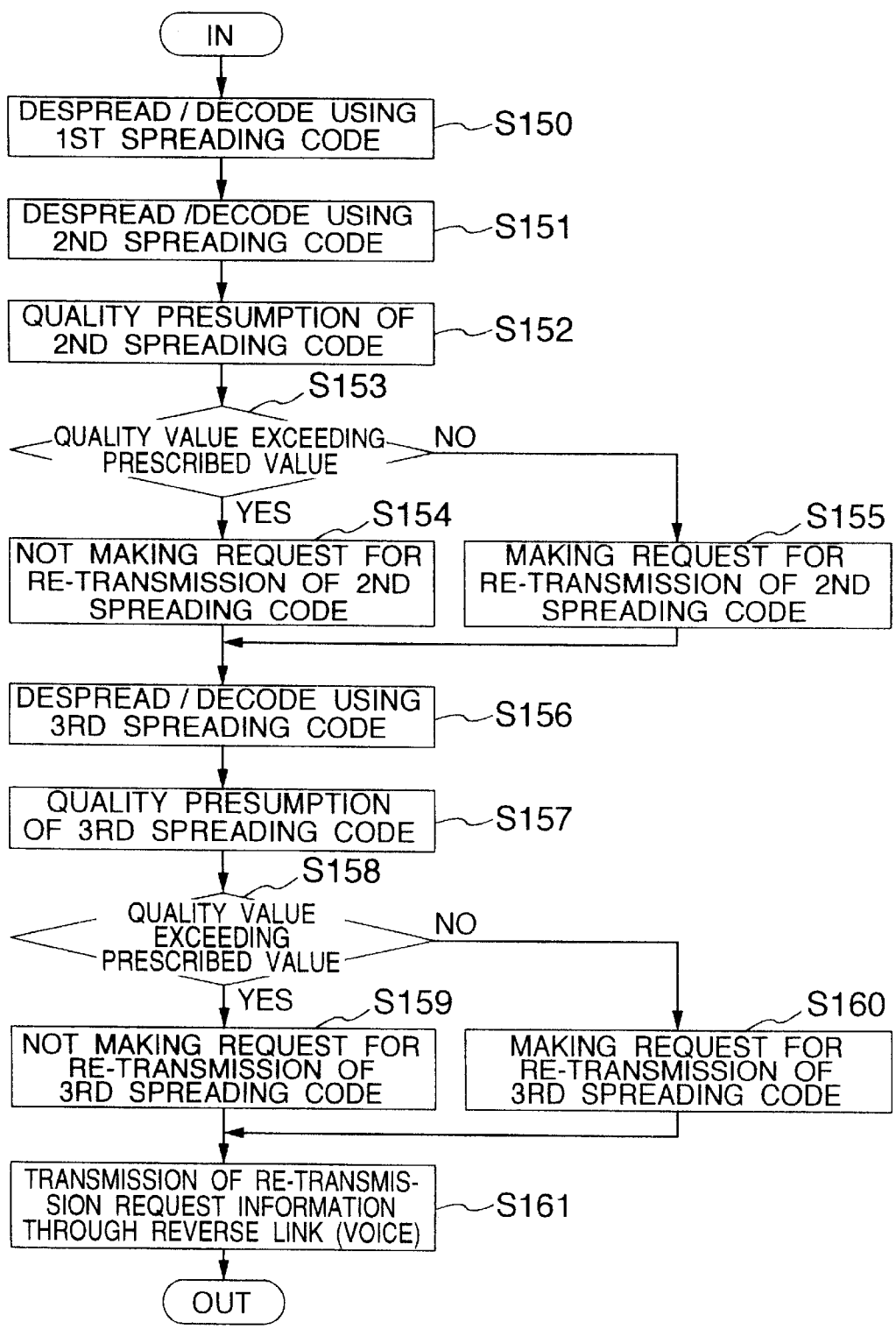
FIG. 11 is a flow chart for explaining the operation of a transmitting/receiving apparatus according to a seventh embodiment of the present invention.

A base station side transmitting/receiving apparatus and a mobile station side transmitting/receiving apparatus according to the seventh embodiment of the present invention are constructed similarly to the previously-described base station side transmitting/receiving apparatus and mobile station side transmitting/receiving apparatus according to the first embodiment and therefore, the operation of the base station side transmitting/receiving apparatus and mobile station side transmitting/receiving apparatus according to the seventh embodiment will be described hereunder with reference to a flow chart shown in FIG. 11 and frame formats shown in FIGS. 12A–12D.

As an example, an instance will be considered where voice and data are transmitted from the base station to the mobile station though a forward link and voice is transmitted from the mobile station to the base station through a reverse link. In the forward link, the first spreading code is assigned to voice and the second and third spreading codes are assigned to data and in the reverse link, the fourth spreading code is assigned to voice (see FIGS. 12A–12D).

The following description may meet an instance where transmission from the mobile station to the base station is carried out if the base station is replaced with the mobile station and the reverse link is replaced with the forward link.

First Process

In the mobile station side transmitting/receiving apparatus, a forward link signal transmitted from the base station side transmitting/receiving apparatus is received and the receiving signal is subjected to despread and decoding processes using the first spreading code to reproduce transmitting symbols (voice and control information)(step S150). The receiving signal is also subjected to despread and decoding processes using the second spread code to reproduce transmitting symbols (data and control information) (step S151). Quality of the transmitting symbols reproduced in step S151 is presumed (step S152) and then, it is decided whether the presumed quality values exceed a prescribed value and whether a re-transmission request is to be made (steps S153 to S155).

Subsequently, the receiving signal is further subjected to despread and decoding processes using the third spreading code to reproduce transmitting symbols (data and control information) (step S156). Quality of the transmitting symbols reproduced in step S156 is presumed (step S157) and then it is decided whether the presumed quality values exceed a prescribed value and whether a re-transmission request is to be made (steps S158 to S160).

Subsequently, information concerning the presence or absence of the request for re-transmission of the second spreading code and the presence or absence of the request for re-transmission of the third spreading code is described in the reverse link control information (see FIG. 12D) and the reverse link signal (voice) using the fourth spreading code is transmitted to the base station (step S161).

Second Process

In the base station side transmitting/receiving apparatus, the reverse link signal transmitted from the mobile station side transmitting/receiving apparatus is received and then the receiving signal is subjected to despread and decoding processes using the fourth spread code to reproduce transmitting symbols (voice and control information). The reproduced control information is channel-decoded and the presence or absence of a request for re-transmission of the second spreading code and the presence or absence of a request for re-transmission of the third spreading code are examined. In the presence of the re-transmission request, re-transmission is effected.

What is claimed is:

1. Transmitting/receiving apparatuses installed in a base station and a mobile station, respectively, to perform mutual transmission and reception by using a plurality of spreading codes, said transmitting/receiving apparatus installed in said base station comprising means for designating to said mobile station kind and number of spreading codes to be used in a reverse link from said mobile station to said base station through a forward link from said base station to said mobile station at the time that communication with said mobile station is started, said transmitting/receiving apparatus installed in said mobile station comprising means for transmitting a signal to said base station by using the spreading codes of the designated kind and number, and said transmitting/receiving apparatus installed in said base station further comprising means for detecting receiving quality values of the signal transmitted from said mobile station with respect to individual spreading codes used in said mobile station, means for deciding whether the detected receiving quality values exceed a prescribed quality value, and means for finally setting kind and number of spreading codes to be used in said reverse link on the basis of spreading codes for which the detected receiving quality values are determined to exceed the prescribed quality value.

2. Transmitting/receiving apparatuses according to claim 1, wherein said transmitting/receiving apparatus installed in said base station further comprises means for reducing the number of spreading codes to be used in said reverse link and designating the reduced number of spreading codes to said mobile station through said forward link when the detected receiving quality values are all determined to be smaller than said prescribed quality value.

3. Transmitting/receiving apparatuses according to claim 1, wherein said transmitting/receiving apparatus installed in said base station further comprises means for deciding wheth er receiv ing quality values of the signal transmitted from said mobile station exceed a prescribed quality value after the kind and number of spreading codes to be used in said reverse link are finally set, and means for re-setting the kind and number of spreading codes to be used in said reverse link on the basis of the spreading codes for which the detected receiving quality values are determined to exceed said prescribed quality value.

4. Transmitting/receiving apparatuses according to claim 3, wherein said transmitting/receiving apparatus installed in said base station further comprises means for increasing the number of spreading codes to be used in said reverse link and re-designating the increased number of spreading codes to said mobile station through said forward link when receiving quality values of the signal transmitted from said mobile station are all determined to exceed said prescribed quality value after the kind and number of spreading codes to be used in said reverse link are finally set.

5. Transmitting/receiving apparatuses according to claim 3, wherein said transmitting/receiving apparatus installed in said base station further comprises means for reducing the number of spreading codes to be used in said reverse link and re-designating the reduced number of spreading codes to said mobile station through said forward link when receiving quality values of the signal transmitted from said mobile station are all determined to be smaller than said prescribed quality value after the kind and number of spreading codes to be used in said reverse link are finally set.

6. Transmitting/receiving apparatuses installed in a base station and a mobile station, respectively, to perform mutual transmission and reception by using a plurality of spreading codes, said transmitting/receiving apparatus installed in said base station comprising means for designating to said mobile station kind and number of spreading codes to be used in a forward link from said base station to said mobile station through said forward link at the time that communication with said mobile station is started, and means for transmitting a signal to said mobile station by using spreading codes of the designated kind and number, and said transmitting/receiving apparatus installed in said mobile station comprising means for detecting receiving quality values of the signal transmitted from said base station with respect to individual spreading codes, means for deciding whether the detected receiving quality values exceed a prescribed quality value, and means for finally setting the kind and number of spreading codes to be used in said forward link on the basis of spreading codes for which the detected receiving quality values are determined to exceed said prescribed quality value.

7. Transmitting/receiving apparatuses according to claim 6, wherein said transmitting/receiving apparatus installed in said base station further comprises means for reducing the number of spreading codes to be used in said forward link and re-designating the reduced number of spreading codes to said mobile station through said forward link when the detected receiving quality values are all determined to be smaller than said prescribed quality value.

8. Transmitting/receiving apparatuses according to claim 6, wherein said transmitting/receiving apparatus installed in said mobile station further comprises means for deciding whether receiving quality values of the signal transmitted from said base station exceed a prescribed quality value after the kind and number of spreading codes to be used in said forward link are finally set, and means for re-setting the kind and number of spreading codes to be used in said forward link on the basis of the spreading codes for which the detected receiving quality values are determined to exceed said prescribed quality value.

9. Transmitting/receiving apparatuses according to claim 8, wherein said transmitting/receiving apparatus installed in said mobile station further comprises means for increasing the number of spreading codes to be used in said forward link and re-setting the increased number of spreading codes when receiving quality values of the signal transmitted from said base station are all determined to exceed said prescribed quality value after the kind and number of spreading codes to be used in said forward link are finally set.

10. Transmitting/receiving apparatuses according to claim 8, wherein said transmitting/receiving apparatus installed in said base station further comprises means for reducing the number of spreading codes to be used in said forward link and re-setting the reduced number of spreading codes when receiving quality values of the signal transmitted from said base station are all determined to be smaller than said prescribed quality value after the kind and number of spreading codes to be used in said reverse link are finally set.

11. A transmitting/receiving apparatus for performing transmission and reception by using a plurality of spreading codes, comprising:

means for detecting receiving signal quality values with respect to individual spreading codes;

means for deciding whether or not the detected quality values exceed a prescribed quality value; and means for making a request for re-transmission of spreading codes for which the detected quality values are determined to be below said prescribed quality value.

* * * * *